US009992139B1

(12) United States Patent
Meyer et al.

(10) Patent No.: US 9,992,139 B1
(45) Date of Patent: Jun. 5, 2018

(54) VIRTUALIZED COMPUTING RESOURCE SCHEDULER

(71) Applicant: Amazon Technologies, Inc., Reno, NV (US)

(72) Inventors: Timothy John Meyer, Oakton, VA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 699 days.

(21) Appl. No.: 14/040,464

(22) Filed: Sep. 27, 2013

(51) Int. Cl.
*G06F 15/16* (2006.01)
*H04L 12/58* (2006.01)
*G06Q 10/10* (2012.01)
*G06F 12/00* (2006.01)

(52) U.S. Cl.
CPC ........... *H04L 51/00* (2013.01); *G06Q 10/107* (2013.01)

(58) Field of Classification Search
CPC ......... H04L 51/12; H04L 51/14; G06Q 20/10; G06Q 20/342; G06Q 50/01; G06Q 30/0234; G06Q 30/0224; G06Q 30/0226; G06Q 30/0235; G06Q 20/28; G06Q 30/0215; G06Q 20/354; G06Q 30/0207; G06Q 30/06; G06Q 20/12; G06Q 20/105; G06Q 20/227; G06Q 30/02; G06Q 10/01
IPC ..................................................... G06Q 10/107
See application file for complete search history.

(56) References Cited

U.S. PATENT DOCUMENTS

| 7,711,847 B2* | 5/2010 | Dhupelia ................ A63F 13/12 463/30 |
| 2006/0200374 A1* | 9/2006 | Nelken ................ G06Q 10/109 705/7.19 |
| 2008/0162649 A1* | 7/2008 | Lee ........................ H04L 51/32 709/206 |
| 2011/0016214 A1* | 1/2011 | Jackson .................. G06F 9/505 709/226 |
| 2012/0209954 A1* | 8/2012 | Wright ............... H04L 43/0817 709/217 |
| 2012/0278381 A1* | 11/2012 | Ferlitsch .............. G06Q 10/109 709/203 |
| 2013/0191480 A1* | 7/2013 | Oliver .................. G06Q 10/107 709/206 |
| 2014/0223427 A1* | 8/2014 | Bootland .................. G06F 8/61 718/1 |
| 2014/0245297 A1* | 8/2014 | Hackett ................ G06F 9/5077 718/1 |

FOREIGN PATENT DOCUMENTS

WO    WO2005020507 A1 *  5/2005  ............ H04L 12/14

* cited by examiner

*Primary Examiner* — Zarni Maung
(74) *Attorney, Agent, or Firm* — Thorpe North & Western, LLP.

(57) ABSTRACT

A technology to schedule a virtualized computing resource is described. A scheduling request electronic message is received. The scheduling request electronic message has a resource identifier, an action and a trigger condition. The scheduling request is authenticated by verifying a sender of the scheduling request is on an approved list defined for the virtualized computing resource, using an electronic challenge sent to a requestor of the scheduling request electronic message. An action is performed on the virtualized computing resource referenced by the resource identifier when the trigger condition is met.

20 Claims, 9 Drawing Sheets

VIRTUALIZED COMPUTING RESOURCE SCHEDULER

BACKGROUND

Hosted computing services have been a way to minimize computing costs and/or provide a more robust computing environment. A hosted computing service provider, for instance, may give a service level agreement (SLA) guaranteeing a certain level of reliability. Moreover, a user may be able to purchase virtualized computing resources for a specific period of time, for example, rather than having to purchase the physical computing resource outright. Using virtualized computing resources, users may be able to spread computing resource costs amongst a large number of users and allow the users to consume the virtualized computing resources that the users need, when the users need the computing resource.

Running a virtualized computing resource all the time when the resource is utilized infrequently may not be efficient. Some utilities may allow a user to manually or programmatically initialize and terminate a virtualized computing resource. However, manually initializing and terminating virtualized computing resources may be cumbersome. Further, utilities that allow a user to programmatically initialize and terminate a virtualized computing resource may be difficult to learn and use. Moreover, some users may forget about a virtualized computing resource and may leave it running for long periods when they are not using the virtualized computing resource. Leaving a virtualized computing resource running when the virtualized computing resource is not being used may impact the efficient use of the virtualized computing resource (i.e. since the virtualized computing resource may not be able to be re-used elsewhere), and may also impact the user's financial incentive to use the virtualized computing resource in order to minimize computing costs.

DETAILED DESCRIPTION

A virtualized computer resource scheduling technology is described that may allow a user to control a virtualized computing resource through an electronic message, such as an email. For example, a user may control a virtualized computer resource by sending a scheduling request email with an internet calendaring system (ICS) file attached thereto to a scheduling server. The ICS file may specify, for instance, an initialization time and a termination time for a virtualized computing instance. The scheduling server may authenticate the user that sent the scheduling request and may then monitor for the initialization time to initialize the virtualized computing instance. Further, the scheduling server may monitor for the termination time to terminate the virtualized computing instance. In one example, the scheduling server may monitor a calendar for the initialization time and termination time. Other types of electronic messaging may be used in addition to email with an ICS attachment.

In another example, use of a virtualized computing resource may be triggered based on a price point for using the virtualized computing resource. Some virtualized computing resources, for instance, may be sold based on a changing market price. Triggering the use of the virtualized computing resource based in part on when the market price falls below a threshold, and/or discontinuing use of the virtualized computing resource when the market price rises above a threshold may be useful. Some users, for example, may run computing intensive applications on a large dataset. Limiting use of the virtualized computing resource to periods when the market price for using a virtualized computing resource is low may reduce overall costs. More specifically, scheduling request may request that two hours of virtualized computing time be initiated for a virtualized computing instance when the market spot price falls below a specific cost per hour. The technology may also provide a means to grant or limit account privileges or supplement an existing credential system. Moreover, the account privileges may be refined to include or limit tasks available to a user, where the tasks are related to control of the virtualized computing resource. In one example, the user may be granted initialization and termination rights on the virtualized computing resource, for instance. Thus, the user may not be allowed to delete the virtualized computing resource.

The technology also supports scheduling instantiations of a class of virtualized computing resources. A class of virtualized computing resources may include both virtualized hardware and software and thereby function as software as a service (SaaS). For example, an instance of a key-value database management system or a multi-player game platform may be instantiated using the technology. Another example of a class of virtualized computing resources may include instantiating a configured virtualized computing network.

Figure 1:
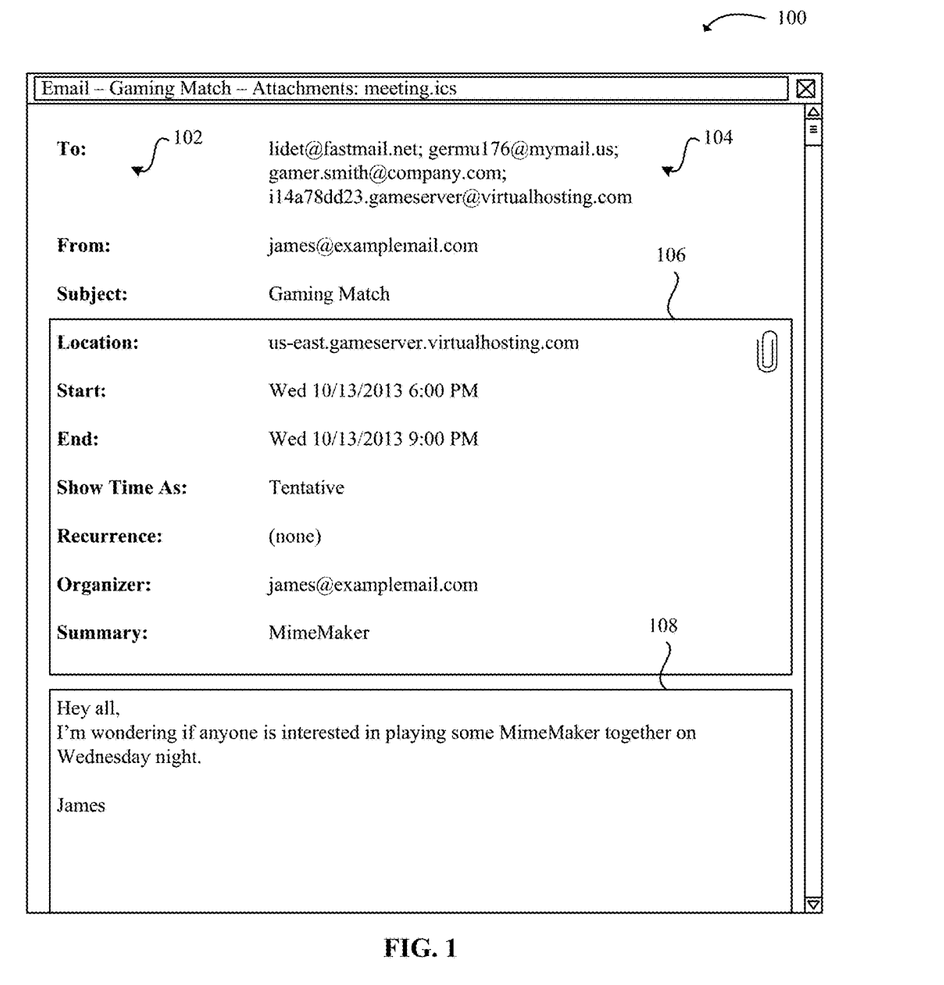
FIG. 1 illustrates an example of a scheduling request email.

To more clearly describe the technology, examples are now provided with reference to the figures. Accordingly, FIG. 1 illustrates an example of a scheduling request email 100. The scheduling request email 100 may include a plurality of header fields 102 and header values 104 specifying information such as from whom the scheduling request email 100 was sent and to whom the scheduling request email 100 was sent. In particular, the scheduling request email 100, as depicted, may have been sent from "james@examplemail.com" and may have been sent to "lidet@fastmail.net", "germu176@mymail.us", "gamer.smith@company.com" and "i14a78dd23.gameserver@virtualhosting.com". As illustrated, these recipients of the scheduling request email 100 may include a virtualized computing instance email address (e.g. "i14a78dd23.gameserver@virtualhosting.com") that may allow the user to control a virtualized computing resource. In particular, the scheduling request email 100 may include an ICS attachment 106 specifying a scheduling request to initialize a virtualized computing instance. In another example, the message may include a scheduling request to initialize a virtualized compute instance at a defined time or when a specific market spot price is available for the computing resource. The ICS attachment 106 may also request a termination time of the virtualized computing resource. A virtual location may be specified in the ICS attachment 106 and may be used to specify the virtualized computing resource. The virtual location may refer to a virtualized resource name, a virtual meeting room or the virtual location may be a reference to an actual geographic region where a virtualized resource may be executing. Additionally other fields may be used as appropriate to control the virtualized computing resource.

In addition to sending the scheduling request email 100 to the virtualized computing instance email address, a scheduling request email 100 may also be sent to other users. For example, an online gaming group may organize themselves and use the technology to host online gaming matches on a virtualized computing instance. As depicted, the user with the email address of "james@examplemail.com" has invited the users with email addresses of "lidet@fastmail.net", "germu176@mymail.us" and "gamer.smith@company.com" to join him in playing an online game (e.g. MimeMaker) on the specified date. To this end, the user with the email address of "james@examplemail.com" has also included the virtualized computing instance email address as a recipient on the scheduling request email 100. More particularly, the scheduling request email 100, as depicted, may serve to initialize and terminate the virtualized computing instance at the specified times, and may also serve to inform the other invited users to participate in the online game being hosted on the virtualized computing instance at the specified time.

In addition to the ICS attachment 106, the scheduling request email 100 may include a message body 108. The messaging body 108 may be used to communicate with other users on an email distribution list, and may also be used to configure the virtualized computing resource being controlled by the scheduling request email 100. In particular, the message body 108 may be formatted with keywords and values to control the virtualized computing resource. As one example, the message body 108 may be formatted with a keyword "FIREWALL::" and values to specify which networking ports are open to the public Internet on the virtualized computing resource. As another example, message body 108 may be formatted with keyword and value "MEM::64 GB" to specify that the virtualized computing resource (e.g. a virtualized computing instance) should be initialized with 64 GB of memory. While such the scheduling request email 100 is depicted as an email, it is appreciated that other types of electronic messaging may be used, including instant messages (IM), simple messaging service (SMS) messages, Internet relay chat (IRC) messages, web mail, pager messages, etc.

After the scheduling request email 100 is sent, the scheduling server may receive the scheduling request email 100. As depicted, the scheduling request email 100 may include a sender address (e.g. "james@examplemail.com"), a resource identifier (e.g. "i14a78dd23.gameserver") and an initialization time (e.g. "Wed Oct. 13, 2013 6:00 PM"). Upon receiving the scheduling request email 100, the scheduling server may send a confirmation email to the sender address (e.g. "james@examplemail.com") with a link to a confirmation page. The user may then visit the confirmation page by following the link in the confirmation email and/or message. In doing so, the scheduling server may receive a request from the user for the confirmation page. This request for a confirmation page may allow the scheduling server to verify that the scheduling request email 100 is authentic. After having authenticated the scheduling request email 100, the scheduling server may initialize the virtualized computing resource referenced by the resource identifier at the initialization time.

As mentioned briefly earlier, the scheduling request email 100 may have a termination time (e.g. Wed Oct. 13, 2013 9:00 PM). In this way, the scheduling server may know to terminate the virtualized computing resource at the termination time. The scheduling request email 100 may include both an initialization time and a termination time, thereby providing a scheduled use of the virtualized computer resource. In the example of the virtualized computer resource being used to host an online gaming service, this configuration allows the gaming users to prearrange use of the virtualized computing resource. The gaming users may then be able to keep costs to a minimum by using the virtualized computing resource when they are actually having an online gaming match. If a termination time is not provided, then the virtual computing resource may keep executing until another scheduling message is sent to terminate the virtual computing resource or the user manually terminates the virtual computing resource through a web interface or application programming interface (API) call. Alternatively, if no termination time is provided, the scheduling server may query the user with an email message or another type of message to determine whether this lack of a termination time is intentional or not.

The technology may also provide a means to grant or limit account privileges or supplement an existing credential system. For example, some virtualized computing resources may be restricted to be used by paying customers of the virtualized computing resource hosting service. It may be against the terms of service (TOS) to share one's account credentials, and more importantly, sharing account credentials may create security concerns. As a result, the technology may be used to supplement an existing credential system. The scheduling server may be used to manage accounts on the scheduling server using a whitelist of individuals who may access a scheduled virtualized computing resource. This account management may be useful, for example, where a group of users may need to schedule use of a virtualized computing resource while billing may need to be directed to a single user. Moreover, these account privileges may be refined to include or limit tasks related to control of the virtualized computing resource. In one example, the user may be granted initialization and termination rights on the virtualized computing resource, for instance. Thus, the user may not be allowed to delete the virtualized computing resource. The technology may also include business rules to limit the types of trigger conditions or actions that may be permissible.

Figure 2:
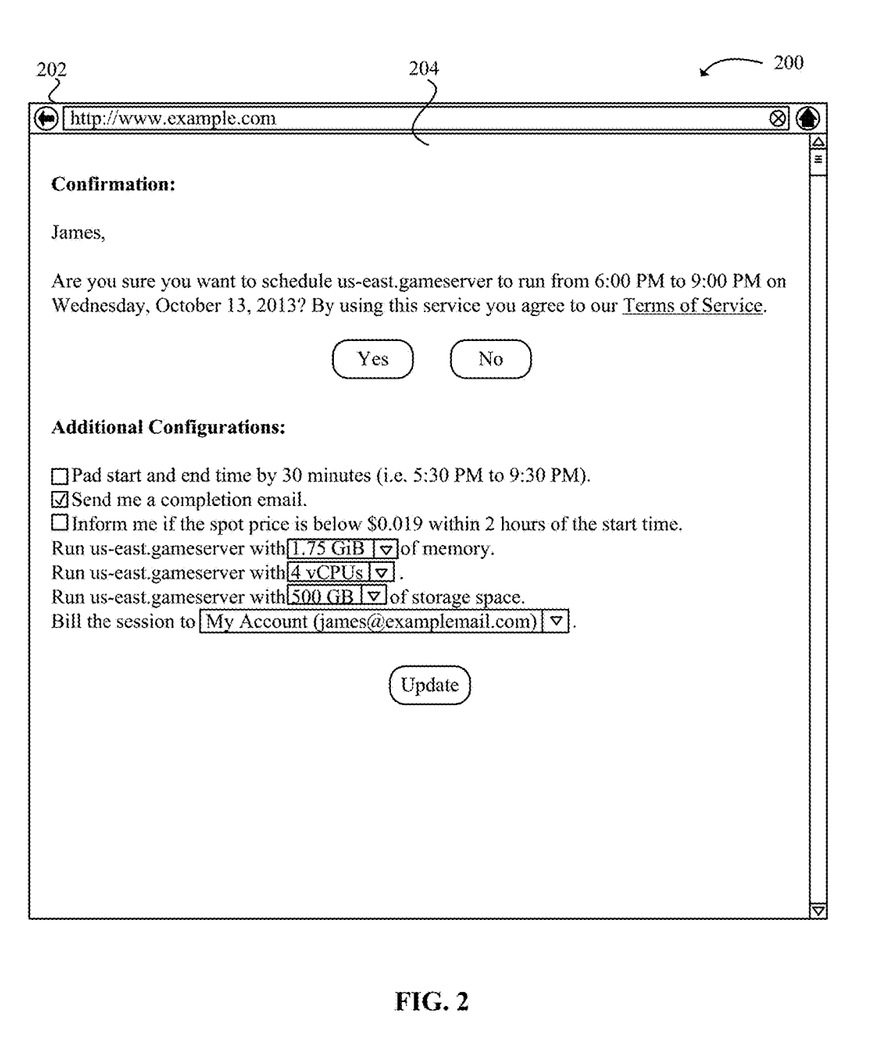
FIG. 2 illustrates an example of a confirmation interface.

FIG. 2 illustrates an example of a confirmation interface 200. The confirmation interface 200 includes a browser 202 with a confirmation page 204 rendered therein. After receiving a scheduling request electronic message, the scheduling request may be authenticated by comparing the sender of the scheduling request with an approved list for a virtual computing resource. The authentication of the scheduling request may include verifying that the sender is on the approved list and sending an electronic challenge to the requestor of the scheduling request. For example, the electronic challenge may include an electronic message to the requestor having a link to the confirmation page 204. The response may include enabling the requestor to follow the link to the confirmation page 204.

The confirmation page 204 may request that the user confirm the scheduling request. This may be useful, for example, to avoid accidental scheduling requests being performed. As shown on the confirmation page 204, a confirmation section asks the user whether he is sure the user wants to schedule i14a78dd23.gameserver to run from 6:00 PM to 9:00 PM on Wednesday, Oct. 13, 2013. The confirmation page 204 may also be used to signal agreement to legal terms such as a TOS.

The confirmation page 204 may also be used to provide additional configurations including, for example, modifying trigger conditions, enabling follow-up emails, modifying the virtualized computer resource, editing billing information or any other type of configuration related to the virtualized computing resource or an account. As depicted in FIG. 2, for instance, the confirmation page 204 may include a checkbox to pad a start and end time by 30 minutes. The confirmation page 204 may also include a checkbox for requesting a completion email and a checkbox for spot pricing information. Additionally, the confirmation page 204 may specify configurable options for the virtualized computer resource (e.g. "i14a78dd23.gameserver") including memory, virtual CPUs (vCPUs) and storage space. The additional configurations may be submitted, for instance, by clicking an update or submit button.

The confirmation page 204 may send a response to the scheduling server for the electronic challenge. In this way, the requestor (e.g. James) may be able to provide a response to the electronic challenge by using the confirmation page 204. Alternatively, the user may be able to authenticate by sending a digitally signed scheduling request. In this way, an electronic challenge may not be necessary. Finally, after providing such an authentication for the scheduling request, an action may be performed on the virtualized computer resource when a trigger condition (e.g. time or price) is met.

The confirmation page 204 may also include a list various enabled and disabled account privileges of the current user or a set of users. For example, a checkboxes may be checked or unchecked next to the set of users to indicate which account privileges are enabled for each of the users. Further, account privileges may be enabled or disabled through and electronic message such as email.

Figure 3:
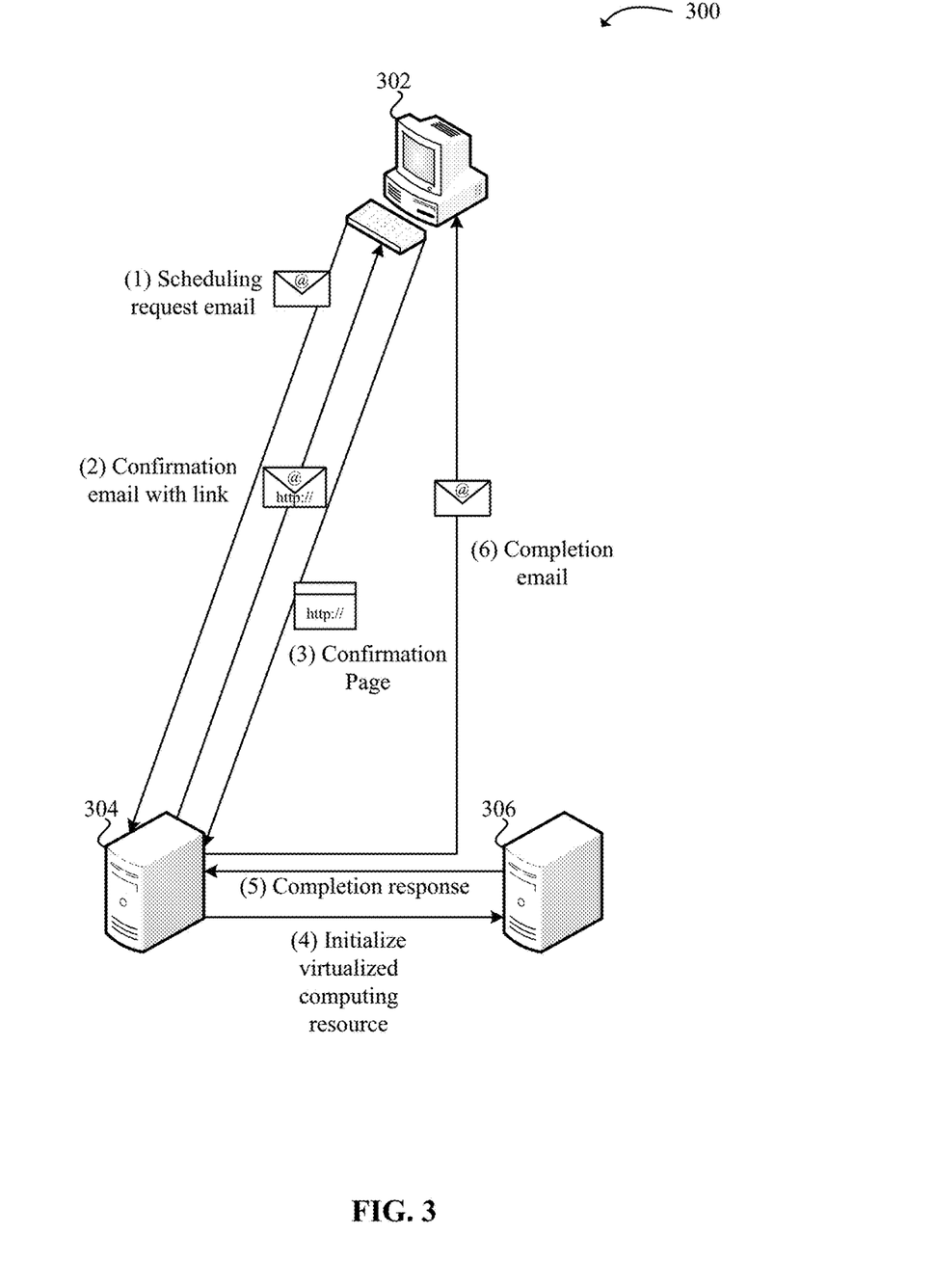
FIG. 3 is a schematic overview of an example of scheduling a virtualized computing resource.

FIG. 3 is a schematic overview 300 of an example of scheduling a virtualized computing resource. In particular, a requestor 302 may initiate the scheduling of the virtualized computer resource 306 by sending a scheduling request email to a scheduling server 304. The scheduling server 304 may receive the scheduling request email and authenticate the scheduling request email by comparing the sender of the scheduling request email with an approved list for the virtualized computing resource 306. The scheduling request email may include a resource identifier, an action and a trigger condition. The resource identifier may be used to identify the virtualized computing resource 306, while the trigger condition may be used to determine when the action is executed on the virtualized computing resource 306.

The scheduling server 304 may then send a confirmation email with the link to the requestor 302, and the requestor 302 may then follow the link to a confirmation page, such as the one previously described with reference to FIG. 2. By providing a confirmation email with a link to the requestor 302, the scheduling server 304 may ensure that the scheduling request email has not been spoofed or otherwise tampered with. The confirmation page may alternatively be included in a message within an account restricted area of a site. The confirmation page may allow for further configuration of the virtualized computing resource 306. The confirmation page may also be utilized after the trigger condition is met to further configure or extend the virtualized computing resource 306 or trigger condition. For example, the user may schedule the virtualized computing resource 306 to be used for a two hour software demonstration. If it appears to the user that the software demonstration may actually go for 2 hours and 15 minutes, the user may utilize the confirmation page to extend usage of the virtualized computing resource 306. Alternatively, the user may be able to further configure or extend the virtualized computing resource 306 through various other means including through a configuration email or by accessing an account restricted configuration page on a site.

Once the scheduling request email has been authenticated, the scheduling server 304 may monitor the trigger condition until the trigger condition is met and then perform an action, such as initializing a virtualized computing instance, terminating a virtualized computing instance or loading a database. The trigger condition may be any sort of monitorable condition. Some examples include a date and time, a price point for using the virtualized computing resource or any other type of monitorable condition. As another example, a trigger condition may include when an available unused virtualized computing resource is available (e.g., a virtualized computing resources has been reserved and paid for by a customer but is currently unused). Thus, as depicted in FIG. 3, the virtualized computing resource 306 is initialized and potentially a completion response is later sent from the virtualized computing resource 306 to the scheduling server 304 and forwarded on as an email to the requestor 302. The scheduling server 304 may also handle communicating error messages to the requestor 302 or other users in a distribution list. Moreover, other information may be communicated to the requestor 302 or other users in a distribution list around the time of the trigger and/or action. For example, an Internet protocol (IP) address may be assigned to the virtualized computing resource and communicated to the requestor 302 through the scheduling server 304.

While the scheduling server 304 and the virtualized computing resource 306 may be located remotely from one another as depicted, the scheduling server 304 and the virtualized computing resource 306 may be integrally located. Indeed, the scheduling server 304 may be a separate virtualized computing resource hosted together with the virtualized computing resource 306.

The technology may also be useful in marketing software. For example, a computer aided drafting (CAD) software vendor may use the technology to allow architects, engineers and other designers to use CAD software on a virtualized computing instance by simply scheduling usage of the CAD software using the technology. In this way, the CAD software, or any other type of software, may be a virtualized computing resource that might be monetized. This technology may apply to any type of virtualized computing resource whether the computing resource is a compute service, storage service, database service, application service, networking service or another type of virtualized computing service.

Figure 4:
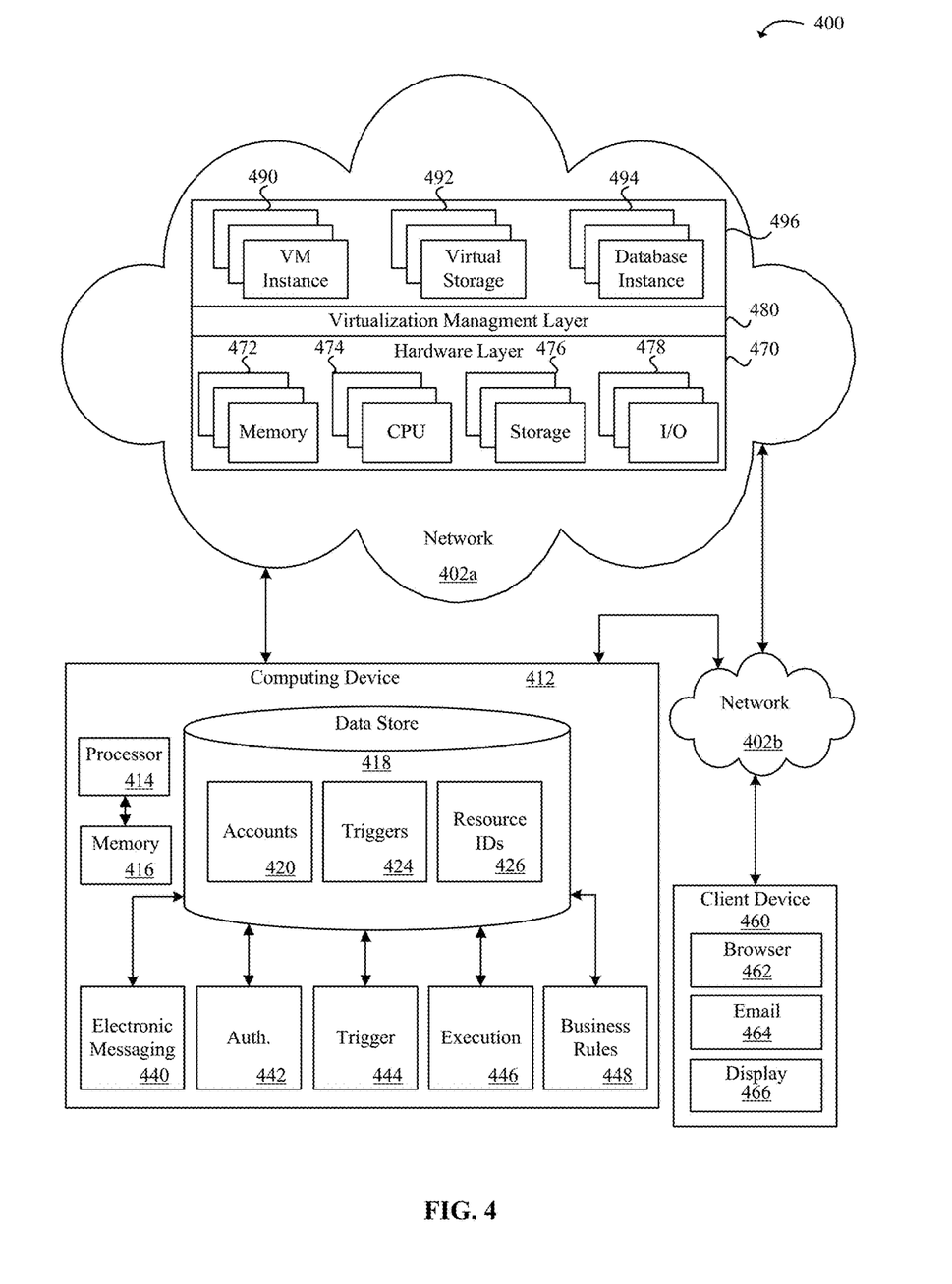
FIG. 4 is a component block diagram illustrating an example system to schedule virtualized computing resources.

FIG. 4 is a component block diagram illustrating an example system 400 to schedule virtualized computing resources. The system 400 may be used to implement the functionality heretofore described with reference to FIGS. 1-3 or other exemplary functionality discussed below, including functionality described with reference to FIGS.

5-9. The system 400 may include one or more computing devices 412, a client device 460 and a plurality of virtualized computing resources 496.

The computing device 412 may include a processor 414 and a memory 416, and the computing device 412 may include a data store 418 having various information stored therein. Additionally, the computing device 412 may include various modules such as an electronic messaging module 440, authentication module 442, a trigger module 444, an execution module 446, a business rules module 448 and other modules to implement functionality described herein.

The electronic messaging module 440 may accept handle incoming and outgoing electronic messages such as emails, instant messages (IM), simple messaging service (SMS) messages, etc. The electronic messages may include scheduling request electronic messages. Additionally the electronic messaging module 440 may be utilized to send the electronic challenge to the requestor. The electronic messaging module 440 therefore may include various communication interface protocols such as the simple mail transfer protocol (SMTP), the internet messaging access protocol (IMAP), the post office protocol (POP), the SMS protocol, the extensible messaging and presence protocol (XMPP), the session initiation protocol (SIP), etc. Moreover, electronic messaging module 440 may include server software such as a mail server, IM server, voice over Internet protocol (VoIP) server or an SMS server.

The authentication module 442 may authenticate the scheduling request. The authentication module 442 may use, for example, data in an accounts data store 420 to verify that the sender of the scheduling request is on an approved list of users to use the virtualized computing resource. Further, the authentication module 442 may use the electronic messaging module 440 to send an electronic challenge using an electronic message. Alternatively, the authentication module 442 may authenticate the scheduling request directly. For example, the authentication module 442 may use a corporate authentication server in a business environment. This may include, for example, using the lightweight directory access protocol (LDAP).

The trigger module 444 may be used to identify when a trigger condition has been met. The trigger module 444 may be used in conjunction with a triggers data store 424 which may store information regarding the triggers including calendar information, price information, or other trigger conditions until they are met. The trigger module 444 may be used to notify the execution module 446 once the trigger condition has been met so that execution of the associated action may be performed.

The execution module 446 may be used to communicate with the virtualized computing resource identified by the scheduling request. The scheduling request may include a resource identifier in a resource identifier data store 426 referencing the virtualized computing resource that the action is to be performed on within the plurality of virtualized computing resources 496. For example, a payroll processing company may receive a large amount of data at the start of each month which is temporarily stored within a virtualized storage device 492. The payroll processing company's data storage needs may then drop after the first few days of the month. A scheduling request may use resource identifiers referencing the virtualized storage device 492 and may provide an action to increase the amount of storage available on the virtualized storage device 492 just before the beginning of each month. Further, the payroll processing company may use a database instance 494 when processing payrolls. The payroll processing company may create an additional scheduling request to utilize the database instance 494 when the virtualized computing resource costs are low during off-peak period. Indeed, scheduling request may include multiple resource identifiers so that the multiple virtualized computing resources may be bound together. In the payroll processing example, the payroll processing company may also wish to initialize a virtualized computing instance 490 when the database instance 494 is initialized. Other types of virtualized computing resources may include a virtualized computer cluster, a virtualized network or any other type of computing resource that can be virtualized with the virtualization management layer 480.

Other modules and/or datastores may also be included with the computing device 412 or additional functionality may be incorporated into the modules and/or data stores heretofore described. As one example, the business rules module 448 may be included to limit the types of trigger conditions or actions that might be permissible. As another example, a feedback module and/or data store may be used to provide feedback to one or more users after a trigger condition has been met. For instance, billing information or computational results may be emailed to users after a trigger condition has been met.

The plurality of virtualized computing resources 496 may run on a virtualized management layer 480 which in turn may run on a hardware layer 470. The hardware layer 470 may be a hosted service residing in a network 402a connected to the computing device 412 and/or the client device 460. Alternatively the computing device 412 may located with the computing device 412 or connect through another network 402b such as the Internet.

The hardware layer may include various hardware components such as a memory 472, a CPU 474, storage mediums or storage devices 476 or various input/output (I/O) 478. Further, the hardware layer may have a virtualized management layer 480 that runs on or across the hardware layer 470. The virtualized management layer 480 may be a piece of computer software, firmware or hardware, or various combinations thereof, that create and runs virtual machines or services. In this way, multiple virtualized computing resources may be run on top of the virtualization management layer 480. In one example, the virtualized management layer may include a hypervisor.

A hypervisor may be computer software, firmware or hardware that creates and runs virtual machines. The hypervisor may run one or more guest virtual machines on a host machine computer. The hypervisor may present the guest virtual machines' guest operating systems with a virtual operating platform and may manage the execution of the virtual machines' guest operating systems. Multiple instances of a variety of operating systems may share the virtualized hardware resources. The scheduling request may be used to predetermine placement of a virtualized computing resource on the hardware layer 470. For instance, the trigger condition may be a date and time. By aggregating multiple scheduling requests the computing device 412 may forecast virtualized computing resources needs.

The virtualized functionality of the system 400, and other functionality described herein, may be embodied on a non-transitory machine readable storage medium having a plurality of instructions adapted to be executed to implement the aforementioned functionality.

The network 402b may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

The client device 460 may be an example of a client running a browser 462. Moreover, client applications (e.g., a web application) may run within the browser 462 and the client device 460 may have a display 466 for displaying pages rendered within the browser 462 to interface with the user. Additionally, the client device 460 may include an email application 464 to send and receive emails.

Based on the aforementioned parameters, the client device 460 may be a device such as, but not limited to, a desktop computer, a laptop, a tablet, a mobile device, a television, a cell phone, a smart phone, a hand held messaging device, a set-top box, a gaming console, a custom data assistant, an electronic book reader, heads up display (HUD) glasses, a car navigation system, or any device with a display that may receive and present the information.

The computing device 412 may comprise, for example, a server computer or any other system providing computing capability. Alternatively, a plurality of computing devices 412 may be employed that are arranged, for example, in one or more server banks or computer banks or other arrangements. For purposes of convenience, the computing device 412 may be referred to in the singular, but it is understood that a plurality of computing devices 412 may be employed in various arrangements as described above.

Various processes and/or other functionality, as discussed herein, may be executed in the system 400 according to various examples. The computing device 412, may for example, provide some central server processing services while the client device 460 may provide local processing services and interface processing services to interface with the services of the computing device 412. Therefore, it is envisioned that processing services, as discussed herein, may be a centrally hosted functionality and/or a virtualized service or an independent service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the client device 460, a processor 414 may provide processing instructions by communicating with a memory 416 on the computing device 412. That is, the memory device may include instructions operable to be executed by the processor to perform a set of actions. The processor 414 and/or the memory 416 may directly or indirectly communicate with a data store 418.

Various data may be stored in the data store 418 that is accessible to the computing device 412. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 418 may include storage systems such as a SAN (Storage Area Network), cloud storage network, volatile or non-volatile RAM, optical media, or hard-drive type media. The data store 418 may be representative of a plurality of data stores 418.

Figure 5:
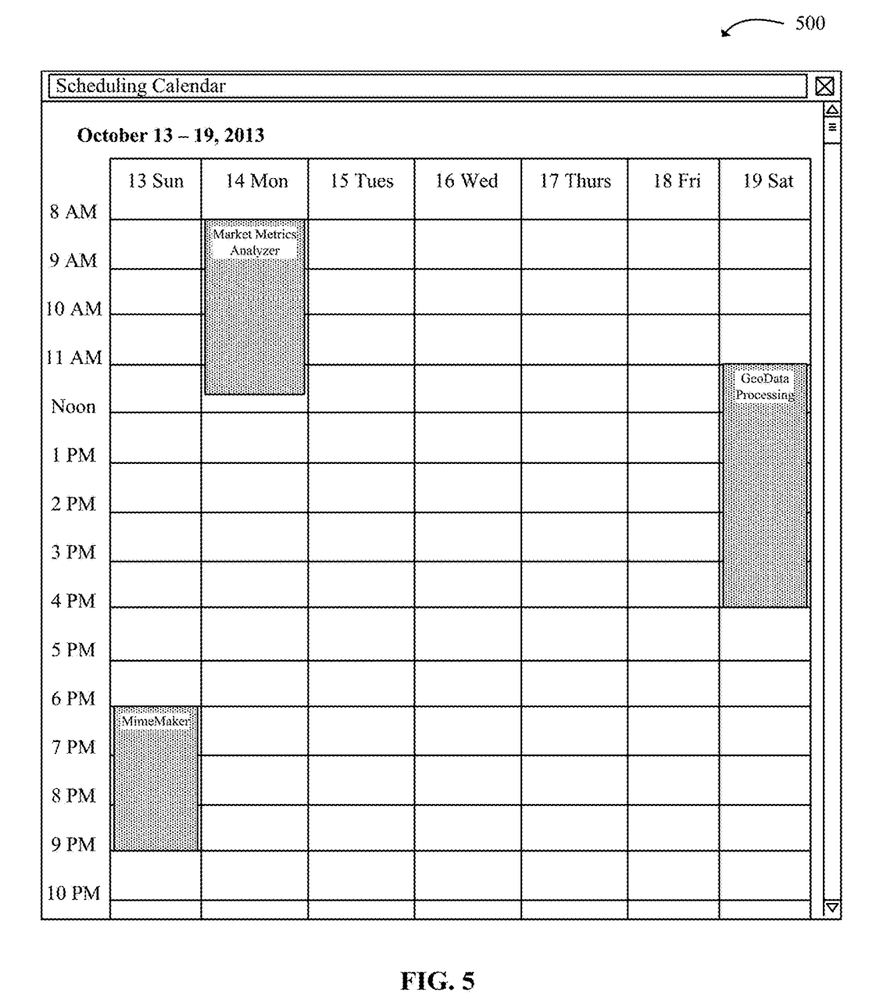
FIG. 5 illustrates an example scheduling calendar for use in scheduling virtualized computing resources.

FIG. 5 illustrates an example scheduling calendar 500 for use in scheduling virtualized computing resources. The technology may be used to run a virtualized computing resource for a set period of time. In this way, a scheduling request may include a first trigger condition coupled to a first action and a second trigger condition coupled to a second action. Namely, the first trigger condition may be an initialization date and time and the first action may be an initialization of a virtualized computing resource. Likewise, the second condition may be a termination date and time and the second action may be a termination of the virtualized computing resource.

Use of the scheduling calendar 500 may be useful for virtualized computing resources that are mutually exclusive. For example, software may be a virtualized computing resource that is limited by the number of licenses to the software. In this way, the virtualized computing resource may be scheduled exclusively such that only the maximum number of instantiations of the software is made at any one time. The scheduling calendar 500 may be particularly useful in providing a visual overview of information of when the virtualized computing resources are unavailable for given periods of time due to the virtualized computing resource's nature as a mutually exclusive resource.

The scheduling calendar 500 may be maintained on a scheduling server or with one or more external calendaring services. The scheduling calendar 500 may visualize a single virtualized resource, a class of virtualized resources or a coalition of virtualized resources.

Figure 6:
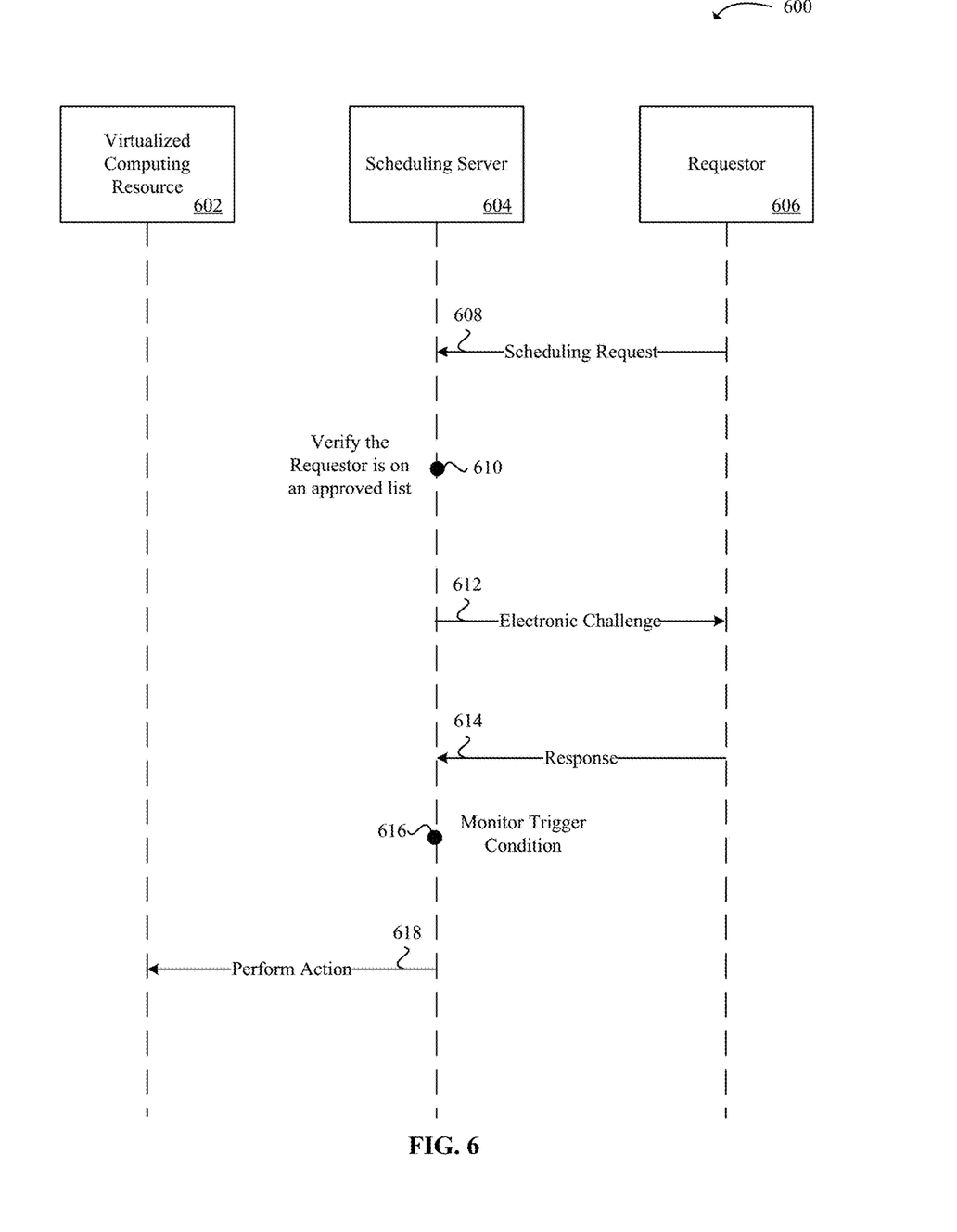
FIG. 6 is a sequence chart illustrating an example virtualized computing resource scheduling method.

FIG. 6 is a sequence chart 600 illustrating an example virtualized computing resource scheduling method. The sequence chart 600 includes a virtualized computing resource 602, a scheduling server 604 and a requestor 606. The requestor 606 begins by sending a scheduling request 608 to the scheduling server 604.

The scheduling server 604 may then verify that the requestor is on an approved list 610 and send an electronic challenge 612 to the requestor 606. The electronic challenge may include an electronic message to requestor with a link to the confirmation page 204. Alternatively, the electronic message can contain the confirmation page 204. The requestor 606 may then provide a response 614 to the electronic challenge 612. The response 614 may include the requestor following the link to the confirmation page 204. As an alternative, the response to the electronic challenge 612 may be an API call to a centralized authentication service. An enterprise, for instance, may use an enterprise wide authentication service or domain manager. Thus, the response 614 may be created as a result from the API call to the centralized authentication service.

Once the scheduling request 608 has been authenticated with the electronic challenge 612 and the response 614, the scheduling server 604 may monitor a trigger condition 616. When the trigger condition 616 has been met, the scheduling server 604 may then initiate performance of the action on the virtualized computing resource 602 as indicated by 618.

Figure 7:
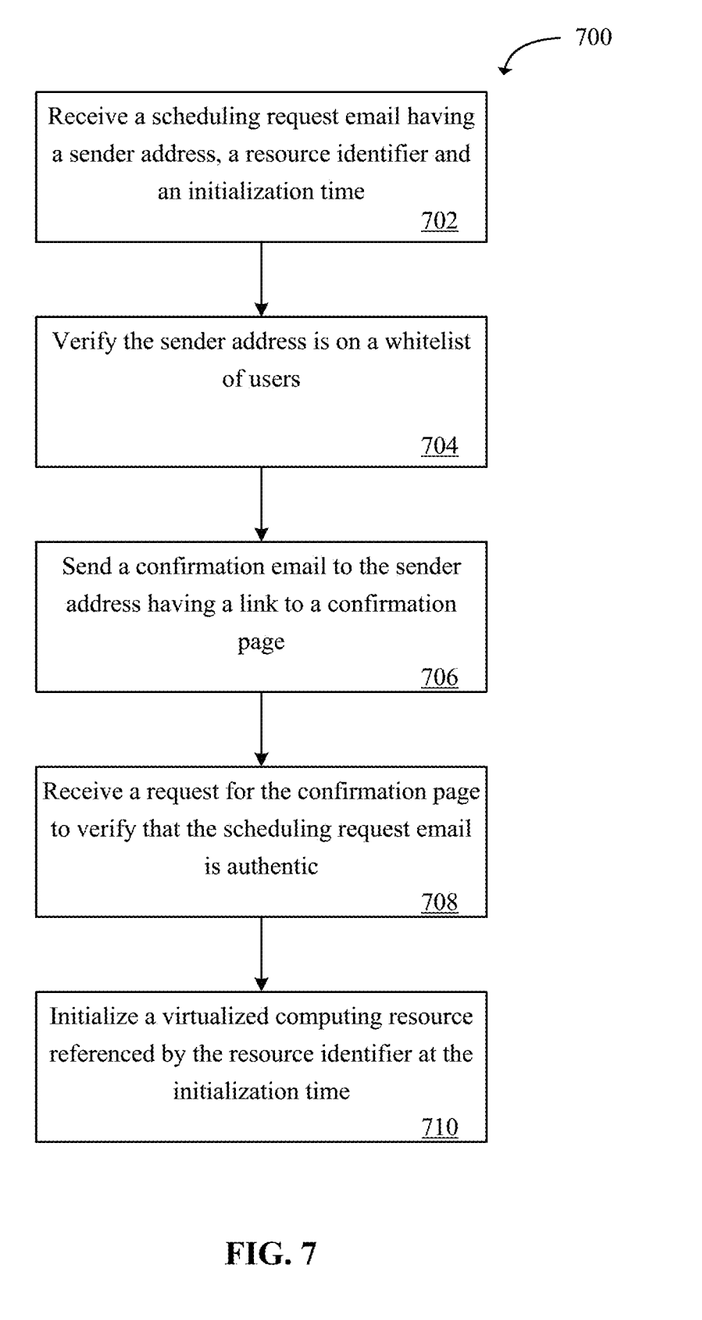
FIG. 7 is a flowchart illustrating an example method to schedule virtualized computing resources.

FIG. 7 is a flowchart illustrating an example method 700 to schedule virtualized computing resources. The method may include receiving a scheduling request email having a sender address, a resource identifier and an initialization time, as shown in method element 702. The scheduling request may be received by a scheduling server. The method may also include verifying the sender address is on a whitelist of users as shown in method element 704. The scheduling server, for example, may be used to manage accounts on the scheduling server using the whitelist of users who may access a scheduled virtualized computing resource.

The method may also include sending a confirmation email to the send address having a link to a confirmation page as shown in method element 706. Upon receiving the scheduling request email, a confirmation email with a link may be sent to the requestor. A further operation may be receiving a request for the confirmation page to verify that the scheduling request email is authentic as shown in method element 708. The user may then visit the confirmation page by following the link such that the scheduling server may receive a request for the confirmation page. This request for confirmation page and/or the response the confirmation page allows the scheduling server to verify that the scheduling request email is authentic.

The method may also include initializing a virtualized computing resource referenced by the resource identifier at the initialization time, as shown in method element 710. The scheduling request may include the resource identifier referencing the virtualized computing resource that the action is to be performed on. Further, the scheduling request may include multiple resource identifiers so that the multiple virtualized computing resources may be bound together. Types of virtualized computing resources may include a virtualized computer cluster, a virtualized network, a virtualized computing instance, a virtualized storage device, a virtualized database or any other type of computing resource that can be virtualized.

Figure 8:
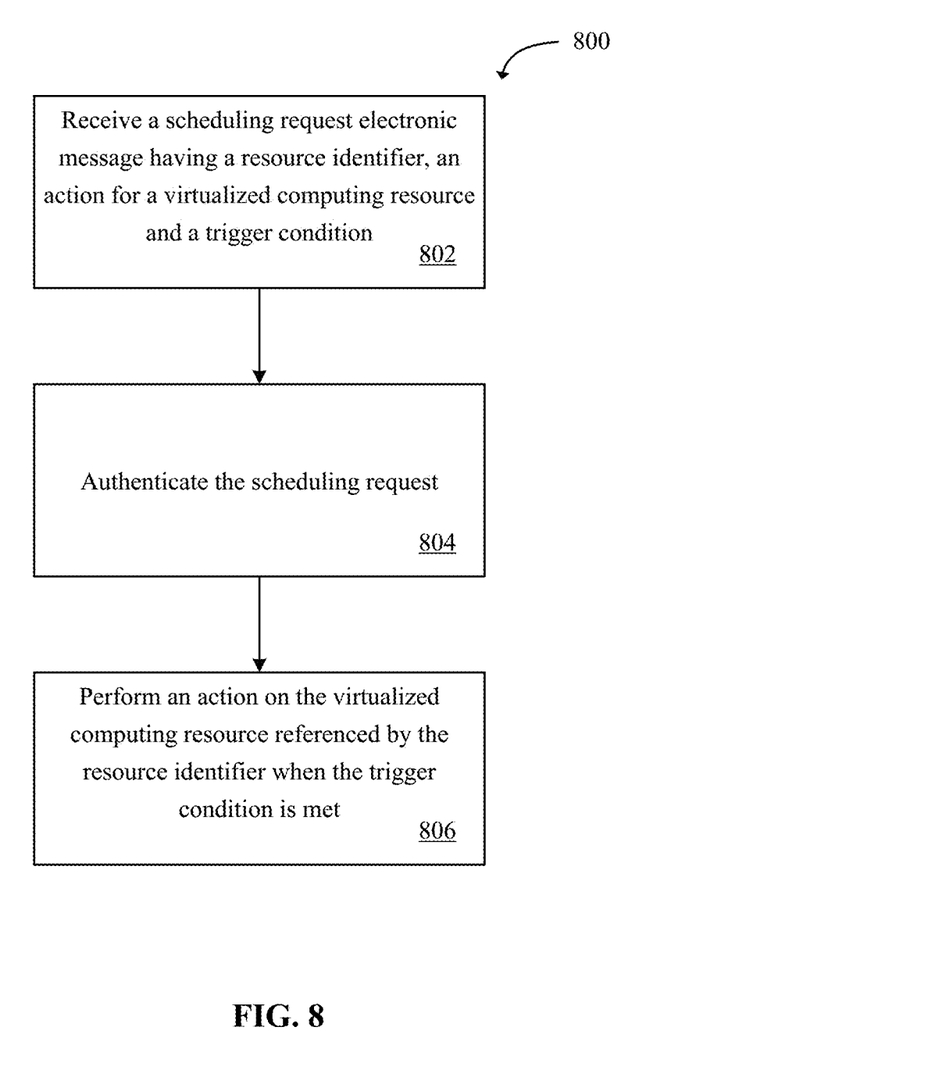
FIG. 8 is a flowchart illustrating another example method to schedule virtualized computing resources.

FIG. 8 is a flowchart illustrating another example method 800 to schedule virtualized computing resources. The method may include receiving a scheduling request electronic message having: a resource identifier, an action for a virtualized computing resource and a trigger condition, as in method element 802. The trigger condition may be any sort of monitorable condition. Some examples include a date and time, a price point for using the virtualized computing resource or any other type of monitorable condition. The method may also include authenticating the scheduling request as shown in method element 804. Authentication of the scheduling request may include verifying that a sender of the scheduling request is on an approved list defined for the virtualized computing resource, using an electronic challenge sent to a requestor of the scheduling request electronic message. An electronic challenge may be sent to a requestor of the scheduling request electronic message, and a response to the electronic challenge may be received from the requestor. A further operation may be performing the action on the virtualized computing resource referenced by the resource identifier when the trigger condition is met, as in method element 806. The scheduling server, for example, may monitor the trigger condition until the trigger condition is met and then perform an action, such as initializing a virtualized computing instance, terminating a virtualized computing instance or loading a database. This technology may allow a user to control a virtualized computing resource through an electronic message such as an email.

Figure 9:
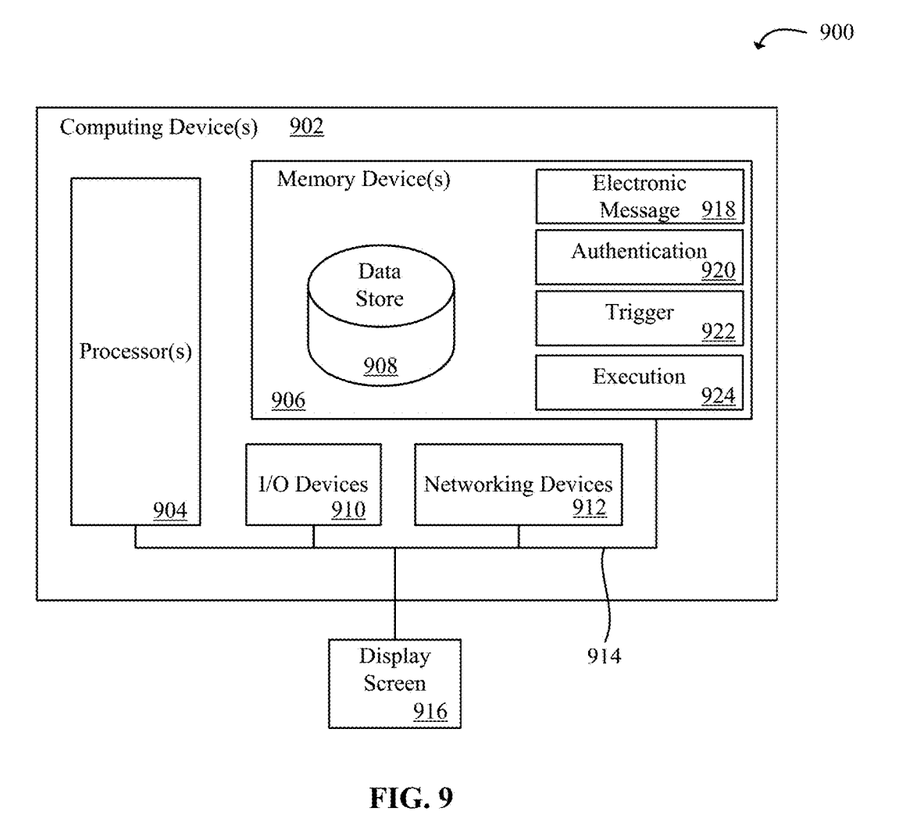
FIG. 9 is block diagram illustrating an example of a computing device that may be used for virtualized computing resource scheduling.

FIG. 9 is block diagram 900 illustrating an example of a computing device 902 that may be used for virtualized computing resource scheduling In particular, the computing device 902 illustrates a high level example of a device on which modules of the disclosed technology may be executed. The computing device 902 may include one or more processors 904 that are in communication with memory devices 906. The computing device 902 may include a local communication interface 914 for the components in the computing device. For example, the local communication interface 914 may be a local data bus and/or any related address or control busses as may be desired.

The computing device 902, for instance, may be used to schedule virtualized computing resources. For example, the computing device 902 may be used to receive a scheduling request. The scheduling request may be delivered by electronic message and may include a resource identifier, an action and a trigger condition. The computing device 902 may authenticate the scheduling request, and may then perform the action on a virtualized computing resource referenced by the resource identifier when the trigger condition is met.

In particular, the memory device 906 may contain modules that are executable by the processor(s) 904 and data for the modules. Located in the memory device 906 are modules executable by the processor. For example, an electronic messaging module 918, an authentication module 920, a trigger module 922, an execution module 924 and other modules may be located in the memory device 906. The modules may execute the functions described earlier. For instance, the electronic messaging module 918 may be used as an interface to receive a scheduling request electronic message. The authentication module 920 may authenticate the scheduling request by comparing a sender of the scheduling request with an approved list defined for a virtualized computing resource. The trigger module 922 may monitor for whether a trigger condition has been met. The execution module 924 may perform an action to the virtualized computing resource when the trigger condition is met.

A data store 908 may also be located in the memory device 906 for storing data related to the modules and other applications along with an operating system that is executable by the processor(s) 904.

Other applications may also be stored in the memory device 906 and may be executable by the processor(s) 904. Components or modules discussed in this description that may be implemented in the form of software using high programming level languages that are compiled, interpreted or executed using a hybrid of the methods.

The computing device may also have access to I/O (input/output) devices 910 that are usable by the computing devices. An example of an I/O device is a display screen 916 that is available to display output from the computing devices. Other known I/O devices may be used with the computing device as desired. Networking devices 912 and similar communication devices may be included in the computing device. The networking devices 912 may be wired or wireless networking devices that connect to the internet, a LAN, WAN, or other computing network.

The components or modules that are shown as being stored in the memory device 906 may be executed by the processor(s) 904. The term "executable" may mean a program file that is in a form that may be executed by a processor 904. For example, a program in a higher level language may be compiled into machine code in a format that may be loaded into a random access portion of the memory device 906 and executed by the processor 904, or source code may be loaded by another executable program and interpreted to generate instructions in a random access portion of the memory to be executed by a processor. The executable program may be stored in any portion or component of the memory device 906. For example, the memory device 906 may be random access memory (RAM), read only memory (ROM), flash memory, a solid state drive, memory card, a hard drive, optical disk, floppy disk, magnetic tape, or any other memory components.

The processor 904 may represent multiple processors and the memory device 906 may represent multiple memory units that operate in parallel to the processing circuits. This may provide parallel processing channels for the processes and data in the system. The local interface 914 may be used as a network to facilitate communication between any of the multiple processors and multiple memories. The local interface 914 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method to schedule virtualized computing resources, comprising:
   under control of one or more computer systems configured with executable instructions:
   receiving a scheduling request email with a calendaring system file having a sender address, a resource identifier and an initialization time;
   verifying whether the sender address is on a whitelist of users;
   sending a confirmation email to the sender address having a link to a confirmation page;
   receiving a request for the confirmation page to verify that the scheduling request email is authentic; and
   initializing a virtualized computing resource referenced by the resource identifier at the initialization time, wherein the virtualized computing resource comprises a virtualized operating system.

2. The method of claim 1, further comprising terminating the virtualized computing resource at a termination time, wherein the scheduling request email has the termination time.

3. The method of claim 1, further comprising granting an account privilege to users' on the whitelist for a virtualized computing resource in a virtualized computing system.

4. The method of claim 3, wherein the account privilege includes initializing or terminating the virtualized computing resource.

5. The method of claim 1, wherein the resource identifier is a virtualized computer resource name in a recipient email address referencing the virtualized computing resource.

6. A computer implemented method to schedule virtualized computing resources, comprising:
   under control of one or more computer systems configured with executable instructions:
      receiving a scheduling request electronic message with a calendaring system file having a resource identifier, an action for a virtualized computing resource and a trigger condition, wherein the virtualized computing resource comprises a virtualized operating system;
      authenticating the scheduling request by verifying a sender of the scheduling request is on an approved list defined for the virtualized computing resource, using an electronic challenge sent to a requestor of the scheduling request electronic message; and
      performing the action on the virtualized computing resource referenced by the resource identifier when the trigger condition is met.

7. The method of claim 6, wherein the trigger condition is a price point for using the virtualized computing resource.

8. The method of claim 6, wherein the trigger condition is when a reserved unused virtualized computing resource is available.

9. The method of claim 6, wherein the electronic challenge includes an electronic message to the requestor having a link to a confirmation page, and the response to the electronic challenge includes the requestor accessing the link to the confirmation page.

10. The method of claim 6, wherein the action includes initializing or terminating the virtualized computing resource.

11. The method of claim 6, further comprising performing a second action on the virtualized computing resource in response to a second trigger condition, wherein the scheduling request electronic message has the second trigger condition and the second action.

12. The method of claim 6, wherein the trigger condition is a date and time to perform an action for the virtualized computing resource.

13. The method of claim 12, further comprising providing information that the virtualized computing resource is unavailable at the date and time requested because the virtualized computing resource is a mutually exclusive resource.

14. The method of claim 6, further comprising predetermining placement of the virtualized computing resource on computer hardware based in part on the trigger condition.

15. The method of claim 6, wherein the virtualized computing resource includes at least one of a virtualized computing instance, a virtualized computer cluster, a virtualized network, a virtualized storage repository, or a virtualized database.

16. A system to schedule virtualized computing resources, comprising:
   a processor;
   a memory device including instructions to be executed by the processor;
   an electronic messaging module to receive a scheduling request electronic message with a calendaring system file having a resource identifier, an action for a virtualized computing resource and a trigger condition, wherein the virtualized computing resource comprises a virtualized operating system;
   an authentication module to authenticate the scheduling request by verifying a sender of the scheduling request is on an approved list defined for the virtualized computing resource, sending an electronic challenge to a requestor of the scheduling request electronic message, and receiving a response to the electronic challenge from the requestor;
   a trigger module to identify when the trigger condition is met; and
   an execution module to perform the action using a virtualized computing resource referenced by the resource identifier when requested by the trigger module.

17. The system of claim 16, further comprising a business rules module to limit the trigger condition or the action to a permissible set of trigger conditions or actions.

18. The system of claim 16, wherein the authentication module uses a centralized authentication service to authenticate a user making the scheduling request.

19. The system of claim 16, wherein the virtualized computing resource includes at least one of a virtualized computing instance, a virtualized computer cluster, a virtualized network, a virtualized storage repository, or a virtualized database.

20. The system of claim 16, wherein the virtualized computing resource is located remotely from the execution module and the execution module securely communicates with a location remote from the execution module to perform the action.

* * * * *